United States Patent [19]

Gornowicz et al.

[11] Patent Number: 5,840,813
[45] Date of Patent: Nov. 24, 1998

[54] HOMOPOLYMERIZATION OF ACRYLATE OR METHACRYLATE ENDBLOCKED POLYDIORGANOSILOXANES

[75] Inventors: Gerald Alphonse Gornowicz; Linda Denise Kennan; Anil Kumar Saxena; Arthur James Tselepis, all of Midland, Mich.

[73] Assignee: Dow Corning Corporation, Midland, Mich.

[21] Appl. No.: 779,852

[22] Filed: Jan. 3, 1997

[51] Int. Cl.$^6$ .......................... C08F 283/00; C08F 26/08; C08J 5/54

[52] U.S. Cl. .......................... 525/479; 524/731; 524/806; 524/809; 524/817; 524/832; 524/833; 252/477; 526/263; 526/279

[58] Field of Search ..................... 524/731, 806, 524/809, 817, 832, 833; 525/477, 479; 526/263, 279

[56] References Cited

U.S. PATENT DOCUMENTS

| | | | |
|---|---|---|---|
| 4,499,398 | 2/1985 | Gravier et al. | 524/837 |
| 4,533,254 | 8/1985 | Cooj | 366/176 |
| 4,620,878 | 11/1986 | Gee | 106/287.15 |
| 4,918,123 | 4/1990 | Yang et al. | 524/110 |
| 4,962,165 | 10/1990 | Bortnick | 525/479 |
| 5,234,773 | 8/1993 | Biale | 428/523 |
| 5,502,105 | 3/1996 | Revis | 524/837 |
| 5,504,149 | 4/1996 | Kosal | 524/837 |
| 5,561,188 | 10/1996 | Liles et al. | 524/801 |
| 5,563,214 | 10/1996 | Share et al. | 524/809 |
| 5,594,067 | 1/1997 | Doi et al. | 524/806 |

OTHER PUBLICATIONS

Journal of Applied Polymer Science, vol. 43, 1059–1066, (1991). No Author No Title.
Polymer Processing, 44 (11), 490–497, (1995). No Author No Title.

*Primary Examiner*—James C. Housel
*Assistant Examiner*—Rodney P. Swartz
*Attorney, Agent, or Firm*—James L. DeCesare

[57] ABSTRACT

Method for homopolymerization of polyorganosiloxane macromonomers having acryloxy or methacryloxy groups. A miniemulsion of a methacryloxy functional polydimethylsiloxane macromonomer was prepared by mixing the macromonomer with a surfactant(s), and subjecting it to a high shear device. The macromonomer was polymerized in the miniemulsion by using a free radical initiator at high temperature. The amount of unreacted macromonomer is very low.

8 Claims, No Drawings

HOMOPOLYMERIZATION OF ACRYLATE OR METHACRYLATE ENDBLOCKED POLYDIORGANOSILOXANES

BACKGROUND OF THE INVENTION

This invention is directed to miniemulsion polymerization of acryloxypropyl and methacryloxypropyl functional polydiorganosiloxane macromonomers.

Emulsion polymerization is an important industrial method, because it produces high molecular weight polymers, and because there is no or negligible content of volatile organic compounds (VOC). In a normal emulsion polymerization technique, the oil is emulsified in water with a conventional surfactant using a mechanical shearing device, to produce droplets of 1,000–10,000 nm in diameter. The polymerization is achieved with the assistance of a water or oil soluble initiator or catalyst. These emulsions are generally opaque, milky, and viscous; but they can also be translucent emulsions with particle sizes ranging from about 8–80 nm, when a very high surfactant concentration is employed.

In such conventional emulsion polymerization, the micelles are the primary site for polymerization. However, El-Aasser et al in the *Journal of Applied Polymer Science*, Volume 43, Pages 1059–1066, (1991), show that nucleation can also occur in monomer droplets if they are very small. They termed this phenomenon as "miniemulsion polymerization", with particle sizes ranging from 50–500 nm. According to El-Aasser et al, the miniemulsions are more stable compared to conventional emulsions; they have small particle size, i.e., 50–500 nm. High shear devices such as a submicron disperser, a MICROFLUIDIZER®, or an ultrasonication unit can be used to make the miniemulsion.

According to their technique, a cosurfactant is employed, which is typically a low molecular weight, water insoluble compound, such as cetyl alcohol or hexadecane. It is used for the purpose of retarding the diffusion of the monomer out of the droplets. They postulate that the stability of such a cetyl alcohol system can be attributed to the formation of intermolecular complexes at the oil/water interface, resulting in lower interfacial tension.

El-Aasser et al do not describe the homopolymerization of polyorganosiloxane macromonomers. We are not aware of any published report on the homopolymerization of acryloxy or methacryloxy functional polyorganosiloxanes in solution. Where there is reference to polymerization of silicone macromonomers, the reference is focused toward copolymerization of silicone macromonomers with conventional low molecular weight monomers, and only low conversions have been observed, i.e., T. Chou et al, *Polymer Processing*, Volume 44 [11], Pages 490–496, (1995).

BRIEF SUMMARY OF THE INVENTION

Our invention relates to a method of making an emulsion containing a homopolymer of a polydiorganosiloxane having acryloxy or methacryloxy groups. According to the method, we heat and shear a reaction mixture formed by combining (i) water; (ii) an anionic surfactant, a cationic surfactant, a nonionic surfactant, or a combination of such surfactants; (iii) a cosurfactant such as a fatty alcohol, n-alkane, or halogen substituted n-alkanes; (iv) a mono-acryloxyalkyl terminated polydiorganosiloxane macromonomer (I) or a mono-methacryloxyalkyl terminated polydiorganosiloxane macromonomer (II) having the formula

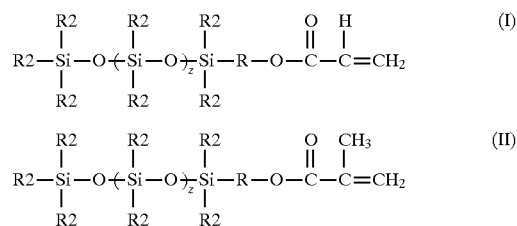

where R in each formula is a divalent hydrocarbon radical with 1–6 carbon atoms; R2 in each formula is the hydrogen atom, a $C_{1-8}$ alkyl radical, a haloalkyl radical, or an aryl radical; and z in each formula is 1–1,000; and (v) a free radical initiator.

Our invention also relates to the homopolymer made according to the above method, and to the emulsion containing the homopolymer.

These and other features and objects of our invention will become apparent from a consideration of the detailed description.

DETAILED DESCRIPTION OF THE INVENTION

A macromer is a polymer of molecular weight ranging from several hundred to tens of thousands, having a functional group at the chain end that can further polymerize. The term macromer is an abbreviation of macromolecular monomer and macromonomer. While the functional group may be any polymerizable group, most typically it is a vinyl group, epoxy group, dicarboxylic acid group, diol group, diamine group, acrylolyl group, or a methacryolyl group.

The homopolymer prepared from the macromonomer (MM) according to our invention can be represented by either of the following formulas

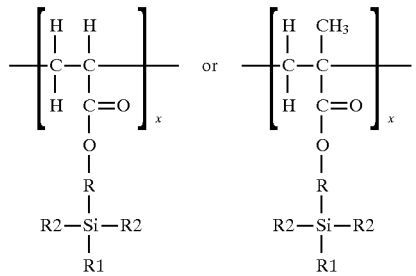

where R1 in each formula is a polyorganosiloxane moiety —$(OSiR2_2)_z OSiR2_3$; R2 in each formula is the hydrogen atom, a $C_{1-8}$ alkyl radical, a haloalkyl radical, or an aryl radical; R in each formula is a divalent hydrocarbon radical with 1–6 carbon atoms; x in each formula is 2–5000; and z in each formula is 1–1,000.

These homopolymers are shown in more detail below

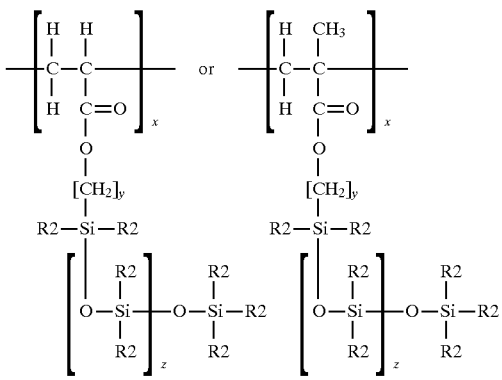

where R2 in each formula is the hydrogen atom, a $C_{1-8}$ alkyl radical, a haloalkyl radical, or an aryl radical; x in each formula is 2–5000; y in each formula is 1–6; and z in each formula is 1–1,000.

Some radicals representative of R2 are alkyl radicals such as methyl, ethyl, isopropyl, butyl, pentyl, hexyl, heptyl, and octyl; aryl radicals such as phenyl and xenyl; and haloalkyl radicals such as 3-chloropropyl, 4-bromobutyl, and 3,3,3-trifluoropropyl.

The macromonomer (MM) used to prepare these homopolymers can be a mono-acryloxypropyl terminated polyorganosiloxane (I) or a mono-methacryloxypropyl terminated polyorganosiloxane (II) shown below:

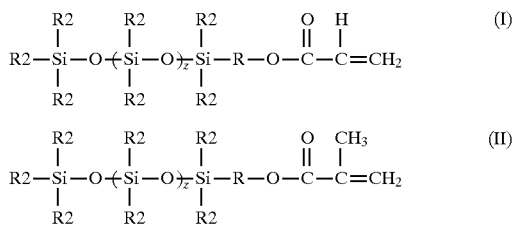

where R, R2, and z are as defined above. These macromonomers can be prepared by methods known in the art, i.e., reacting a silanol endblocked polydimethylsiloxane with acryloxypropyl dimethylchlorosilane or methacryloxypropyl dimethylchlorosilane, in presence of dibutylamine, for example.

The free radical initiator can be an azo initiator conforming generally to the formula:

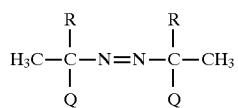

where R is an alkyl radical, and Q is a simple carboxylic acid residue or derivative thereof such as a nitrile ester.

The most preferred free radical initiator is the dialkyl diazine 2,2'-azobisisobutyronitrile (AIBN) shown below:

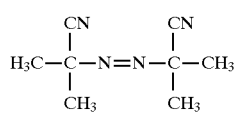

Similar initiating properties can be obtained using 4,4'-azo-4-cyanopentanoic acid (ACPA), a compound shown in the previous formula where R is —$CH_3$ and Q is —$(CH_2)_2COOH$. ACPA is soluble in water, unlike AIBN.

Other classes of free radical initiators can be used including dialkyl hyponitrites, diaroyl peroxides, dialkyl peroxydicarbonates, dialkyl peroxalates, dialkyl peroxides, alkyl hydroperoxides, and disulfides.

The reaction medium can contain ionic, nonionic, and mixtures of ionic and nonionic surfactants to stabilize the polysiloxane in the emulsion. Ionic surfactants can be cationic or anionic including surfactants known in the art as useful in emulsion polymerization.

Suitable anionic surfactants include but are not limited to sulfonic acids and their salt derivatives. Useful anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms; and alkylaryl sulfonates having one or more alkyl groups of eight or more carbon atoms. Commercial anionic surfactants useful in our invention include dodecylbenzene sulfonic acid (DBSA) sold under the tradename BIOSOFT S-100 by Stepan Company, Northfield, Ill.; and the sodium salt of dodecylbenzene sulfonic acid sold under the tradename SIPONATE DS-10 by Alcolac Inc., Baltimore, Md.

Useful cationic surfactants are the various fatty acid amines, amides, and derivatives, and salts of fatty acid amines and amides. Cationic surfactants can be exemplified by aliphatic fatty amines and derivatives such as dodecyl amine acetate, octadecyl amine acetate, and acetates of amines of tallow fatty acids; homologues of aromatic amines having fatty chains such as dodecyl aniline; fatty amides derived from aliphatic diamines such as undecyl imidazoline; fatty amides derived from di-substituted amines such as oleylamino diethylamine; derivatives of ethylene diamine; quaternary ammonium compounds such as tallow trimethylammonium chloride, dioctadecyldimethyl ammonium chloride, didodecyldimethyl ammonium chloride, and dihexadecyldimethyl ammonium chloride; amide derivatives of amino alcohols such as beta-hydroxyethyl stearyl amide; amine salts of long chain fatty acids; quaternary ammonium bases derived from fatty amides of di-substituted diamines such as oleylbenzylamino ethylene diethylamine hydrochloride; quaternary ammonium bases of benzimidazolines such as methylheptadecyl benzimidazole hydrobromide; basic compounds of pyridinium and derivatives such as cetylpyridinium chloride; sulfonium compounds such as octadecyl sulfonium methyl sulfate; quaternary ammonium compounds of betaine such as betaine compounds of diethylamino acetic acid, and octadecylchloromethyl ether; urethanes of ethylene diamine such as condensation products of stearic acid and diethylene triamine; polyethylene diamines; and polypropanol polyethanol amines. Commercial cationic surfactants include products sold under the tradenames ARQUAD T-27W, 16–29, C-33, T-50; and ETHOQUAD T/13 and T/13 ACETATE; by Akzo Chemicals Inc., Chicago, Ill. The anionic or cationic surfactant is present at 0.05–30% by weight of total emulsion, preferably 0.5–20%.

Useful nonionic surfactants have a hydrophilic-lipophilic balance (HLB) of 10–20. Nonionic surfactants with HLB of less than 10 may be used but hazy solutions may result due to limited solubility of the nonionic surfactant in water. When using a nonionic surfactant with HLB less than 10, a nonionic surfactant with HLB greater than 10 should be added during or after polymerization. Commercial nonionic surfactants can be exemplified by 2,6,8-trimethyl-4-nonyloxy polyethylene oxyethanols (6EO) and (10EO) sold under the trademarks TERGITOL® TMN-6 and TERGITOL® TMN-10; alkyleneoxy polyethylene oxyethanol ($C_{11-15}$ secondary alcohol ethoxylates 7EO, 9EO, and 15EO) sold under the trademarks TERGITOL® 15-S-7, TERGITOL® 15-S-9, TERGITOL® 15-S-15; other $C_{11-15}$ secondary alcohol ethoxylates sold under the trademarks TERGITOL® 15-S-12, 15-S-20, 15-S-30, 15-S-40; and octylphenoxy polyethoxy ethanol (40EO) sold under the trademark TRITON® X-405. All of these surfactants are sold by Union Carbide Corporation, Danbury, Conn. Other commercial nonionic surfactants are nonylphenoxy polyethoxy ethanol (10EO) sold under the tradename MAKON 10 by Stepan Company, Northfield, Ill. One especially useful nonionic surfactant is polyoxyethylene 23 lauryl ether (Laureth-23) sold commercially under the tradename BRIJ 35 by ICI Surfactants, Wilmington, Del.

Some commercially available ionic surfactants have characteristics of both ionic and nonionic surfactants combined, such as methyl polyoxyethylene (15) octadecyl ammonium chloride sold under the tradename ETHOQUAD 18/25 by Akzo Chemicals Inc., Chicago, Ill. It is a cationic quaternary ammonium salt with polyethylene oxide tails. When this type of ionic surfactant is used, it may not be necessary to have both ionic and nonionic surfactants in the reaction medium. Only the ionic surfactant having the nonionic characteristics is needed. Surfactants such as ETHOQUAD 18/25 are typically used in the emulsion at levels equal to the level of ionic surfactants used.

A cosurfactant is used in the method according to our invention. The cosurfactant is preferably a hydrophobic solvent or a compound having low water solubility. Representative cosurfactants are, for example, fatty alcohols such as cetyl alcohol $C_{16}H_{33}OH$; and n-alkanes such as n-hexadecane (cetane) $C_{16}H_{34}$ or the halogen substituted derivatives such as 1-chlorodecane (decyl chloride) $CH_3(CH_2)_9Cl$. The presence of such a low molecular weight and relatively water-insoluble compound retards diffusion of monomer out of the droplets.

The reaction mixture is formed by combining 50–80 percent by weight of water; 5–15 percent by weight of the surfactant; 1–5 percent by weight of the co-surfactant; 10–50 percent by weight of the macromonomer; and 0.5–15 percent by weight of the free radical initiator. It is not essential that these ingredients be combined in any given order, although one preferred procedure is to combine water, surfactant(s), and cosurfactant(s), followed by addition of monomer and initiator. However, it is essential to have agitation during and following addition of the ingredients, and to have achieved or to heat to the polymerization temperature as the ingredients are combined. Where practical, agitation and heating should be continued until the monomer is consumed in forming the emulsion.

The process we used for making miniemulsions is similar to the El-Aasser et al procedure; although our initiator was not the same as the initiator used by El-Aasser et al.

According to our process, sodium lauryl sulfate, cetyl alcohol, and water, were first heated at 65° C. for 2 hours, cooled to 40°–45 ° C., and passed through a high shear device to break the gel which formed. The high shear device we employed was a high pressure impingement emulsifier, sold under the trademark MICROFLUIDIZER®, by Microfluidics Corporation, Newton, Mass.

Such high shear devices are described in detail in, for example, U.S. Pat. No. 4,533,254, (Aug. 6, 1985), which is incorporated herein by reference. In general, these high shear devices include a high pressure pump (i.e., up to about 25,000 psi/172,370 kPa), and an interaction chamber where emulsification occurs. A reaction mixture is passed through the emulsifier once at a pressure between 5,000–15,000 psi/34,474–103,422 kPa. Multiple passes through the high shear device result in smaller average particle size, and a narrower range for the particle size distribution.

The macromonomer (MM) and the AIBN initiator were then added to the surfactant mixture and stirred at ambient temperature (20°–25° C./68°–77° C.). The mixture was again introduced to the MICROFLUIDIZER® and passed 4–5 times at 14,000 psi/96,527 kPa. Particle size was measured with the aid of a NICOMP particle size analyzer in dilute solutions. The emulsion was transferred to a 3-neck flask, and after bubbling nitrogen, the emulsion was heated at 60°–65° C. for a period of time.

After polymerization was completed, the emulsion was broken by adding sodium chloride and methanol. The precipitate was washed with hot water and dried in vacuum. Molecular weights of the products were determined by Gel Permeation Chromatography (GPC) in toluene against polystyrene standards with a Refractive Index (RI) detector, or in chloroform against polyglycol standards with an IR detector. The frequency of the IR detector was fixed on Si-O stretching vibrations. The same methodology was applied in all examples shown below with little variation. The methacryloxypropyl polydimethylsiloxane macromonomer was further analyzed and characterized by GPC, IR, $^{13}C$ and $^{29}Si$ Nuclear Magnetic Resonance (NMR). The GPC trace data and the IR spectrum data are shown in Table I. In the IR, the band at ~1640 $cm^{-1}$ was assigned to the double bond, and the band at ~1726 $cm^{-1}$ was assigned to C=O vibrations.

Our invention is illustrated in more detail in the following examples. All reactions were carried out in an atmosphere of nitrogen. GPC analyses were performed on a WATERS 150 C Chromatograph, using a flow rate of 1.2 ml/minute and an injection volume of 200 μl, in toluene against polystyrene standards, and in $CHCl_3$ against polygylcol standards. A refractive index detector was used for toluene measurements, and an IR detector with fixed wavelength on Si-O frequency was used for $CHCl_3$ measurements.

IR spectra were measured on neat liquids in KBr plates on a Perkin Elmer Spectrophotometer. Particle size measurements were made with a NICOMP 370 particle size analyzer. Thermogravimetric Analysis (TGA) measurements were performed on a GENERAL V4.1C Dupont 2100 analyzer. Weighed samples were placed in a platinum pan, and heated at 10° C./minute to about 800° C. under a helium atmosphere. Surface tension measurements were carried out on a ROSANO Tensiometer with a platinum blade. Three measurements were taken on each sample and the values were averaged. Viscosity data were obtained on a BROOKFIELD DV-II Viscometer at 22.8° C.

The starting material used in these examples was the mono-methacryloxypropyl terminated polydimethylsiloxane macromonomer (MM) shown below:

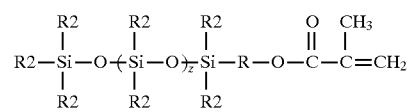

where R2 is methyl, R is —$CH_2CH_2CH_2$—, and z has a value sufficient to provide the (MM) with the viscosity shown in Table 2.

EXAMPLE 1

Deionized water (69.02 gm) was placed in a 250 ml beaker equipped with a magnetic stirrer. Sodium laurel sulfate (0.3 gm), an anionic surfactant, and cetyl alcohol (0.6 gm) were added to the water, and the contents were heated to 60°–67° C. for 2 hours. The contents were allowed to cool to 40°–45° C. and a white gel was obtained. The gel was introduced to a MICROFLUIDIZER®, and the contents were stirred at least 5 times at 10,000 psi/68,948 kPa. The contents were removed from the MICROFLUIDIZER®, macromonomer MM (30 gm) was added to the contents, and the contents were stirred for 10 minutes with a magnetic stirrer. The mixture was again introduced to the MICROFLUIDIZER® and cycled at least 25 times at 14,000 psi/96,527 kPa. The average particle size was determined to be 289 nm. At this point, 2,2'-azobisisobutyronitrile (AIBN) (0.22 gm) was added, and the emulsion was transferred to a 3-neck flask fitted with a nitrogen inlet, condenser, and thermometer. The emulsion was heated at 65° C. for 65 hours. The heating was stopped, and 10 gm of emulsion was set aside. The rest of the emulsion was broken by pouring it into methanol (500 gm) and a solution of NaCl in water (2 gm in 25 ml). The mixture was shaken vigorously. An off-white, sticky, polymer was obtained, which was dried under vacuum. The yield was 20 gm.

In Example 1, the free radical azo initiator AIBN was added after the emulsion was prepared. The polymerization was continued for 65 hours. The long reaction time was needed because higher molecular weight products were not observed in GPC analysis when the emulsions were heated 2–8 hours. After breaking the emulsion, the polymer was analyzed by GPC. The Mn, Mw and Mw/Mn values in toluene and chloroform are shown in Table 1.

As seen from the GPC data, about 71% of the macromonomer was converted to the high molecular weight polymer, although the exact ratio of unreacted macromonomer and homopolymer may vary, as the response factor for the detector was not calculated. The polymer was not high in molecular weight. The MN value suggests that about 10–11 of the macromonomer units were involved. The IR spectrum of the mixture (not shown) did not show any absorption at –1640 cm$^1$.

Surface tension and viscosity of the starting macromonomer and the polymerization products were measured, and the data are shown in Table 2.

EXAMPLE 2

Deionized water (69.02 gm) was placed in a 250 ml beaker equipped with a magnetic stirrer. Sodium laurel sulfate (0.2 gm), dioctyl sulfosuccinate sodium salt (0.2 gm), and cetyl alcohol (0.7 gm) were added to the water, and the contents were heated to 65°–67° C. for 2 hours. The contents were allowed to cool to 40°–45° C. and a white gel was obtained. The gel was introduced to a MICROFLUIDIZER®, and the contents were circulated at least 5 times at 10,000 psi/68,948 kPa. The contents were removed from the MICROFLUIDIZER®, macromonomer (30 gm) was added, and the contents were stirred for 10 minutes with a magnetic stirrer. The mixture was again introduced to the MICROFLUIDIZER® and cycled at least 25 times at 14,000 psi/96,527 kPa. The particle size was determined to be 288 nm. At this point, AIBN (0.22 gm) was added, and the emulsion was transferred to a 3-neck flask fitted with a nitrogen inlet and condenser, and the heating was continued. After 24 hours, more AIBN (0.1 gm) was added. The heating was stopped after 28 more hours of heating. The total heating time was 68 hours. A portion of the emulsion (9 gm) was removed, and the rest of the emulsion was broken by pouring it into methanol (405 gm) and a solution of NaCl in water (5 gm in 25 ml). The mixture was shaken vigorously. An off-white, sticky, polymer was obtained on the surface, which was dried under vacuum. The yield was 24.4 gm.

Example 2 was similar to Example 1, except that additional amounts of AIBN were added during the reaction. The polymerization was continued for 68 hours. After breaking the emulsion, the polymer was analyzed by GPC. The Mn, Mw and Mw/Mn values in toluene and chloroform are shown in Table 1.

EXAMPLE 3

Deionized water (150 gm) was placed in 250 ml beaker equipped with a magnetic stirrer. Sodium lauryl sulfate (0.2 gm) and cetyl alcohol (0.8 gm) were added to the water, and the contents were heated to 65°–67° C. for 2 hours. The contents were allowed to cool to 30°–35° C. and a white gel was obtained. The gel was introduced to the MICROFLUIDIZER®, and the contents were circulated at least 5 times at 10,000 psi/68,948 kPa. The contents of the MICROFLUIDIZER® were removed, the macromonomer (50 gm) was added, and the mixture was stirred for 30 minutes with a magnetic stirrer. At this point, AIBN (0.45 gm) was added. The mixture was again introduced to the MICROFLUIDIZER® and cycled at least 10 times at 14,000 psi/96,527 kPa. The average particle size was determined to be 292 nm. The emulsion was transferred to a 3-neck flask fitted with a nitrogen inlet, condenser, and thermometer. Nitrogen was bubbled through the solution. The emulsion was heated at 65° C. for 68 hours. A portion of the emulsion 45 gm) was removed. The particle size at this stage was determined to be 195 nm. The rest of the emulsion was broken by pouring it into methanol (400 gm) and a solution of NaCl in water (5 gm in 25 ml). The mixture was shaken vigorously, and a thick, oily precipitate, appeared at the top. The oil was dissolved in toluene (100 gm) and dried over anhydrous MgSO$_4$. It was filtered, and the solvent was removed on a rotary evaporator at 70° C./0.1 mm. A highly viscous, off-white oil was obtained. The yield was 44 gm.

Example 3 was similar to Examples 1 and 2, except that in Example 3, AIBN was added to the macromonomer before it was passed through the MICROFLUIDIZER®. The polymerization was continued for 68 hours. After breaking the emulsion, the polymer was analyzed by GPC. The Mn, Mw and Mw/Mn values in toluene and chloroform are shown in Table 1.

The GPC for Example 3 showed a bimodal peak for the reaction product. The Mn and MW values for the high molecular weight peak were 606,600 and 788,500, respectively, whereas the Mn and Mw values for the low molecular weight peak were closer to the values observed in Examples 1 and 2. The IR spectrum of this mixture again did not show any absorption at ~1640 cm . Example 3 clearly shows that methacryloxypropyl polydimethylsiloxane macromonomer can be homopolymerized in high yield by our method.

As noted above, the characteristics of the macromonomer and the polymer products of Examples 1–3 are shown in Tables 1 and 2.

TABLE 1

Emulsion Polymerization of Macromonomer (MM)

| Example | % Conversion of MM | Mn | Mw | Mw/Mn |
|---|---|---|---|---|
| | | GPC in Toluene (RI) | | |
| 1 | 71 | 104,300 | 186,700 | 1.79 |
| 2 | 82 | 116,100 | 198,900 | 1.71 |
| 3 | 72 | 144,000 | 400,000 | 2.78 |
| | | 606,600 | 788,500 | 1.3 |
| Macromonomer (MM) | | 11,330 | 12,330 | 1.08 |
| | | GPC in CHCl$_3$ (IR) | | |
| 1 | 71 | 70,960 | 152,100 | 2.14 |
| 2 | 82 | 82,210 | 168,700 | 2.05 |
| 3 | 72 | 121,200 | 581,600 | 4.79 |
| | | 1,114,000 | 1,401,000 | 1.25 |
| Macromonomer (MM) | | 5,290 | 5,910 | 1.11 |

Regarding Table 1, it should be noted that the molecular weight distribution of a polymer sample describes the relative numbers of molecules of all molecular weight values. Averages of molecular weight such as the number-average molecular weight $M_n$, and the weight-average molecular weight $M_w$, are parameters commonly used to describe the general shape of the molecular weight distribution. One convenient measure of the molecular weight distribution of a polymer is the ratio of weight-average molecular weight $M_w$ to number-average molecular weight $M_n$, ($M_w/M_n$) or polydispersity of the polymer. For a perfectly uniform monodisperse polymer, this ratio is one.

TABLE 2

Surface Tension and Viscosity Data for Methacryloxypropyl Dimethlysiloxane and Homopolymerization Products Thereof

| Sample | Surface Tension (dynes/cm) | Viscosity (cP/mPa s) |
|---|---|---|
| Macromonomer | 20.8 | 25 ± 10 |
| Example 1 | 20.3 | 1510 ± 40 |
| Example 2 | 22.3 | 2030 ± 50 |
| Example 3 | 22.5 | 12970 ± 100 |

The thermal stability of the polymeric blend, i.e., the reaction product and the functional and nonfunctional unreacted macromonomer, obtained in Examples 2 and 3, was also compared by thermogravimetric analysis. Both showed about 38% weight loss at 500° C. After that, the blend from Example 2 showed a sharp weight loss, i.e., 85% at 550° C.; almost a complete loss at 570° C.; and a complete weight loss at about 700° C. No significant difference in thermal stability of the two blends was observed, however.

The preparation of homopolymers of polydiorganosiloxanes having acryloxy or methacryloxy groups in emulsion form provides many advantages and benefits. For example, since acryloxy and methacryloxy functional polyorganosiloxanes cannot generally be homopolymerized in solution, the miniemulsion polymerization process herein provides a technique where monomers can be polymerized to high molecular weight polymers, and yet the emulsions are very stable. The resulting water-based emulsions provide low content of volatile organic compound (VOC), and allow for ease of handling of the polyorganosiloxane polymers.

These highly viscous homopolymers have applications in the personal care arena, i.e. in cosmetics; as well as in ink, paint, and coating industries. They can also be used as additives in lubricants for the auto and oil industry. Typically, the emulsions are used without first extracting the homopolymer; and this is convenient since most silicones are delivered in emulsion form in such industries, and especially in personal care. The result is a significant savings in cost of production.

Other variations may be made in compounds, compositions, and methods described herein, without departing from the essential features of our invention. The forms of invention are exemplary only, and not intended as limitations on its scope, as defined in the appended claims.

We claim:

1. A method of making an emulsion containing a homopolymer of a polyorganosiloxane having acryloxy or methacryloxy groups, comprising heating and shearing a reaction mixture formed by combining (i) water; (ii) an anionic surfactant, a cationic surfactant, a nonionic surfactant, or a combination thereof; (iii) a cosurfactant which is a hydrophobic solvent, or a compound having low water solubility, selected from the group consisting of fatty alcohols, n-alkanes, and halogen substituted n-alkanes; (iv) a mono-acryloxyalkyl terminated polydiorganosiloxane macromonomer (I) or a mono-methacryloxyalkyl terminated polydiorganosiloxane macromonomer (II) having the formula

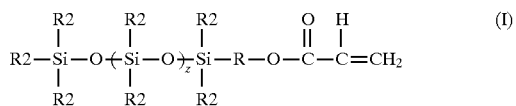

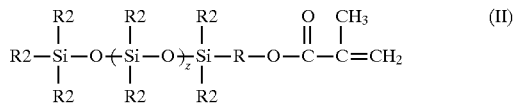

where R in each formula is a divalent hydrocarbon radical with 1–6 carbon atoms; R2 in each formula is the hydrogen atom, a $C_{1-8}$ alkyl radical, a haloalkyl radical, or an aryl radical; and z in each formula is 1–1,000; and (v) a free radical initiator.

2. A method according to claim 1 in which the cosurfactant is a compound selected from the group consisting of cetyl alcohol, n-hexadecane, and 1-chlorodecane.

3. A method according to claim 1 in which the free radical initiator is an azo initiator.

4. A method according to claim 3 in which the free radical azo initiator is a compound having the formula

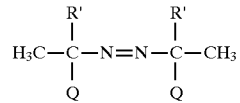

where R' is an alkyl radical, and Q is a carboxylic acid residue.

5. A method according to claim 4 in which the free radical initiator is 2,2'-azobisisobutyronitrile or 4,4'-azo-4-cyanopentanoic acid.

6. A method according to claim 1 in which the homopolymer of the polyorganosiloxane having acryloxy or methacryloxy groups has the formula

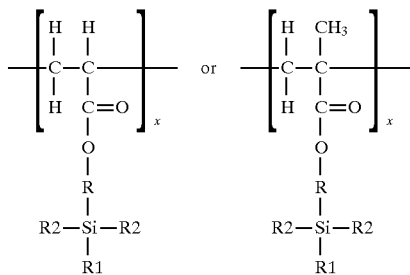

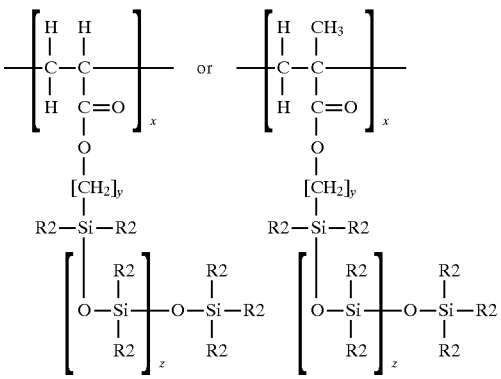

where R1 in each formula is the polydiorganosiloxane moiety —(OSiR2$_2$)$_z$OSiR2$_3$; R2 in each formula is the hydrogen atom, a C$_{1-8}$ alkyl radical, a haloalkyl radical, or an aryl radical; R in each formula is a divalent hydrocarbon radical with 1–6 carbon atoms; x in each formula is 2–5000; and z in each formula is 1–1,000.

7. A method according to claim 6 in which the homopolymer has the formula where R2 in each formula is the hydrogen atom, a C$_{1-8}$ alkyl radical, a haloalkyl radical, or an aryl radical; x in each formula is 2–5000; y in each formula is 1–6; and z in each formula is 1–1,000.

8. An emulsion containing a homopolymer of a polyorganosiloxane having acryloxy or methacryloxy groups made according to the method defined in claim 1.

* * * * *